May 16, 1933.                W. A. BOHN                1,909,747
BEARING
Filed June 27, 1931
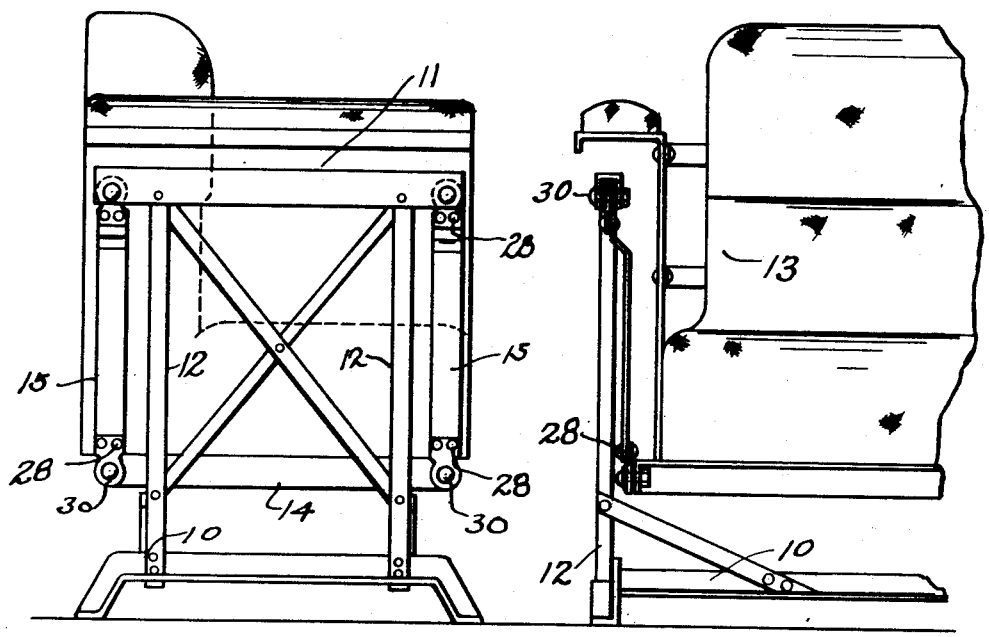
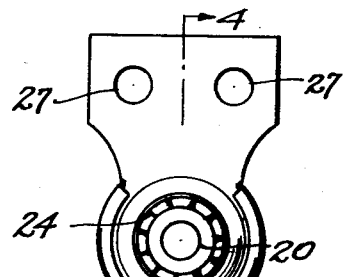
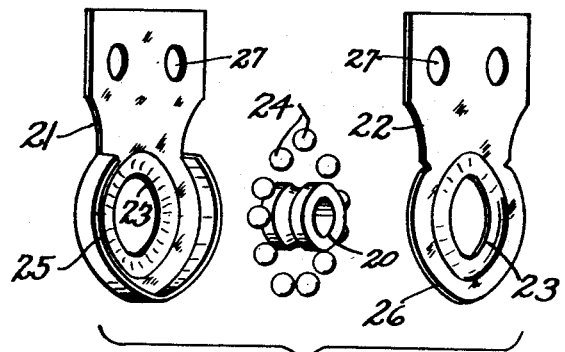
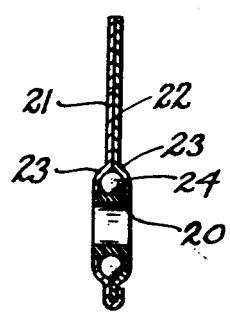
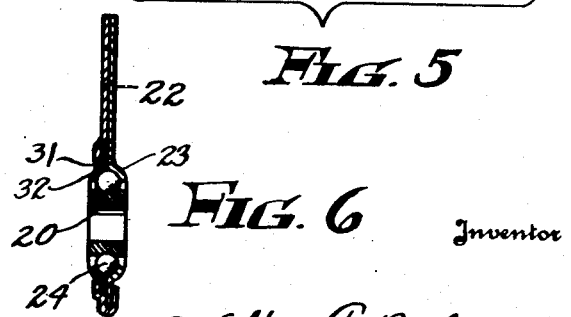
Inventor
Walter A. Bohn
By Bates, Golrick & Teare
Attorneys Patented May 16, 1933

1,909,747

UNITED STATES PATENT OFFICE

WALTER A. BOHN, OF LAKEWOOD, OHIO, ASSIGNOR TO MASTER PRODUCTS COMPANY, OF CLEVELAND, OHIO, A CORPORATION OF OHIO

BEARING

Application filed June 27, 1931. Serial No. 547,391.

This invention relates to bearings, and particularly to those of relatively small size that are adapted to support an article and which are subjected only to slight oscillatory motion during use. Bearings of this type may be used in connection with the operation of porch gliders for supporting the seat upon the stationary frame.

Heretofore, bearings used for this purpose have embodied a hardened stationary inner race and two cup-shaped hardened outerraces, between which the balls have been placed. In addition, it has been necessary to use a pair of enclosing plates, which embraced the faces, and held them in proper operative relationship and which also served to fasten the bearings, as a unit, into the frame or other support with which it is intended for use.

This construction is relatively expensive, and so an object of the present invention is to make a bearing which will, if desired, eliminate the necessity for the use of the extra hardened outer races and yet provide a satisfactory means for attaching the unit to a support. My invention also comprehends the provision of a bearing device, by means of which the attaching members may be furnished either with or without the hardened outer face, and without necessitating the use of an objectionable number of parts and by means of which all the parts except the inner race may be made of stamped pieces.

Referring now to the drawing, Fig. 1 is an end elevation of a porch glider embodying my invention; Fig. 2 is a front elevation of the porch glider shown in Fig. 1; Fig. 3 is a front view of the bearing unit on an enlarged scale and removed from the glider; Fig. 4 is a section taken on the line 4—4 in Fig. 3; Fig. 5 is a perspective view of the various parts which coact to make the bearing unit, and Fig. 6 is a longitudinal section through a modified form of unit.

I have shown my device in connection with a porch glider, but it is to be understood that it is to be used in connection with any device wherein the bearing is intended to be attached to one member and to support another, which is journaled therein. As applied to the porch glider a stationary portion of the glider support is illustrated as a frame 10, that has a top cross-bar, which overhangs the vertical members 12, while the movable portion 13 is shown as having a cross bar 14, which is connected to the bar 11 by links 15. The bearing units which embody my invention then serve as the connecting means between the links and the bars 11 and 14 respectively.

The units illustrated in Figs. 3 to 5, each comprise an inner race 20 and a pair of attaching plates 21 and 22 respectively. These plates each have enlarged portions 23, which together act as an outer ball race for the bearing members 24. To hold the plates in contiguous relationship, I have shown the plate 21, as having a flange 25, which extends around the lower marginal edge thereto, and which is adapted to be crimped over the corresponding edge 26 of the member 22, when the bearing is assembled. These are shown more in detail in Figs. 3 and 4. To permit the units to be attached conveniently to a support, I have shown the plates as having openings 27 which are brought into registration when the unit is assembled, and which serve to hold the unit into engagement with a support by rivets or bolts 28. As applied to a porch glider, the bearing unit is rigidly connected to each end of the links 15, and thus connecting pins 30 extend through the inner races and connect the bearing units to the cross bars 11 and 14 respectively.

It is apparent from the foregoing description, that the enclosing plates may be made of sheet metal stampings, and that the cost of the unit is thereby reduced to a minimum. Where the plates are connected together by a crimping operation, it is likewise apparent that the part, which must be subjected to a forming operation to crimp the two plates together cannot be hardened prior to the crimping operation. Accordingly, if it is desired to obtain a hardened race and yet to make all of the parts except the inner race, of sheet metal, I have shown a modified form of my invention in Fig. 6 wherein the part 22 may be hardened, as it is not subjected to a forming operation after the raised portion 23 is formed therein. The part 21 then may have an opening 31 adjacent the bearing region and may have an interposed deformed washer 32, which coacts with the portion 23 to provide the outer race. The part 32 may be hardened and as the part 21 is not hardened, it may thereafter be crimped over the edges of the part 22, as hereinbefore described.

An advantage of my invention is the fact that the bearing unit possesses few parts, most of which can be made of stampings, which are well adapted to support one member while being attached to another member. Thus, it is well suited for purposes wherein the anti-friction members are subjected only to slight movement while in use.

I claim:—

A bearing unit comprising in combination, an inner race, an outer race and ball bearings interposed therebetween, the outer race comprising flat plates, one of said plates having a portion thereof enlarged to engage the balls and to form half of the race, a washer adapted to engage the plate and to form the other half of the race, and the other plate having an annular enlarged portion embracing the washer, and means carried by the second plate for engaging the first plate and locking all of the parts together as a unit.

In testimony whereof, I hereunto affix my signature.

WALTER A. BOHN.